United States Patent
Fisher

[15] 3,665,789
[45] May 30, 1972

[54] TURRET ASSEMBLY

[72] Inventor: John Fisher, Aurora, Ohio

[73] Assignee: The Warner & Swasey Company, Cleveland, Ohio

[22] Filed: Mar. 9, 1970

[21] Appl. No.: 17,822

[52] U.S. Cl..............................74/813 L, 74/820, 74/824, 74/826, 74/827, 82/36 A
[51] Int. Cl.........................................B23b 29/30
[58] Field of Search................74/813 L, 826, 822, 820, 813, 74/824, 827; 29/27 C, 27 CM; 82/36 A

[56] References Cited

UNITED STATES PATENTS

| | | | |
|---|---|---|---|
| 2,366,079 | 12/1944 | Wilson | 74/813 L |
| 3,191,470 | 6/1965 | Pabst et al. | 74/826 X |
| 3,486,209 | 12/1969 | Shultz et al. | 29/27 C |
| 3,540,332 | 11/1970 | Kvasnicka | 74/826 X |
| 2,979,971 | 4/1961 | Darash | 74/820 |

FOREIGN PATENTS OR APPLICATIONS

| | | | |
|---|---|---|---|
| 1,092,276 | 11/1960 | Germany | 74/813 |
| 1,262,226 | 7/1960 | France | 74/826 |

Primary Examiner—Andrew R. Juhasz
Assistant Examiner—Z. R. Bilinsky
Attorney—Yount and Tarolli

[57] ABSTRACT

An improved machine tool turret assembly includes a turret for holding a plurality of tools. During machining operations the turret is held against rotation by a coupling. Upon operation of the coupling to a disengaged condition by an actuator assembly, a reversible drive assembly is operable to rotate the turret in a selected one of two directions to move a desired tool to an operating position. The coupling is then re-engaged by operation of the actuator assembly. The actuator assembly includes a wedge member which is moved by a cam to effect operation of the coupling between the engaged and disengaged conditions. When the coupling is engaged, a spring applies a biasing force to the wedge member to thereby urge surfaces of the coupling together with a constant clamping force.

12 Claims, 6 Drawing Figures

Patented May 30, 1972

INVENTOR
JOHN FISHER

BY Yount and Tarolli
ATTORNEYS

Patented May 30, 1972

INVENTOR
JOHN FISHER
BY Yount and Tarolli
ATTORNEYS

TURRET ASSEMBLY

This invention relates to a machine tool turret assembly which is selectively operable to move a desired one of a plurality of tools held thereby into operative relationship with respect to a work piece.

It is an object of this invention to provide a new and improved turret assembly for holding a plurality of tools for machining a work piece and wherein the turret assembly includes a reversible drive assembly capable of indexing a turret member in either of two directions to move a selected one of the tools to an operating position relative to the work piece.

Another object of this invention is to provide a new and improved turret assembly for holding a plurality of tools for operating on a work piece in a work area and wherein the turret assembly includes a reversible drive means which is operable in a first direction to rotate a turret member to move a tool disposed on a lower side of an operating position to the operating position and is operable in a second direction to reverse the rotation of the turret member to move a tool disposed on an upper side of the operating position to the operating position.

Another object of this invention is to provide a new and improved turret assembly for holding a plurality of tools for operating on a work piece in a work area and wherein the turret assembly includes a selectively disengageable coupling for retaining a turret member against rotation relative to a base and a coupling actuator assembly which is operable to press surfaces of the coupling together with a predetermined, constant clamping force when the coupling is engaged.

Another object of this invention is to provide a new and improved turret assembly for holding a plurality of tools for operating on a work piece in a work area wherein the turret assembly includes a base, a turret member rotatably mounted on the base for holding the plurality of tools with a selected one of the tools in a predetermined operating position relative to the work piece, coupling means operable between an engaged condition in which first and second clamping surfaces are disposed in abutting engagement to hold the turret member against rotational movement relative to the base and a disengaged condition in which the first and second clamping surfaces are spaced from each other to release the turret member for rotational movement relative to the base, and a wedge member which is urged to a locking position with a substantially constant force by a spring to thereby provide a predetermined clamping force between the clamping surfaces of the coupling when it is in the engaged condition.

Another object of this invention is to provide a new and improved turret assembly having a manually operable handle which is rotatable to effect rotational movement of a turret to move a selected one of the plurality of tools to an operating position wherein operator safety is increased by locating the handle in angular relationship with the work piece such that the handle is spaced a substantial distance from the work piece at all times while it is being rotated by an operator to index the turret.

These and other objects and features of the invention will become more apparent upon a consideration of the following description taken in connection with the accompanying drawings wherein:

FIG. 1 is a schematic illustration depicting the relationship between a turret assembly constructed in accordance with the present invention and a work piece;

FIG. 2 is an enlarged sectional view, taken along the line 2—2 of FIG. 1, illustrating the relationship between a turret for holding a plurality of tools, a drive assembly for indexing the turret, and an actuator assembly for operating a coupling between an engaged condition holding the turret against rotation and a disengaged condition in which the turret is released for rotation under the influence of the drive assembly;

Figure 2:
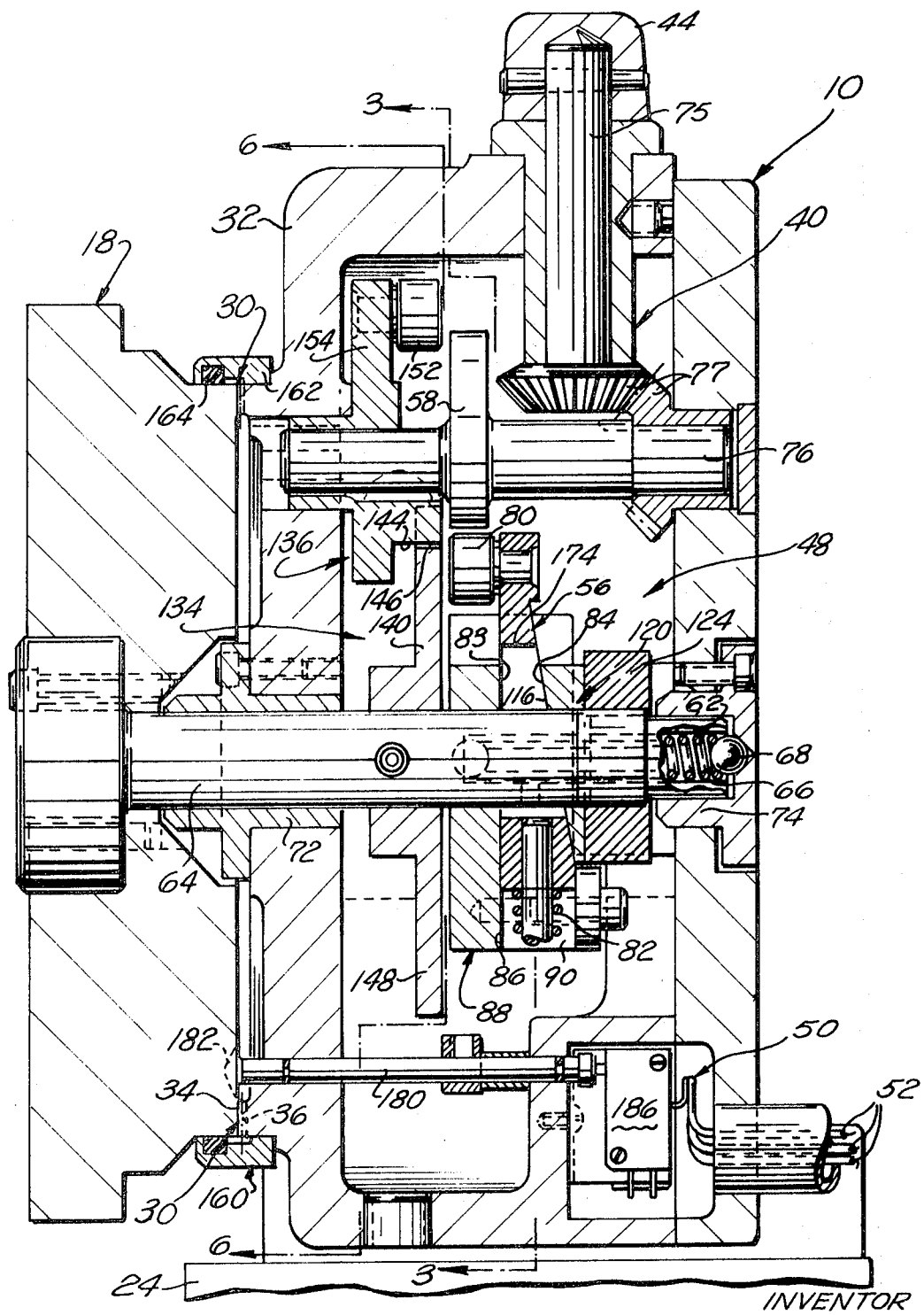
Figure 6:
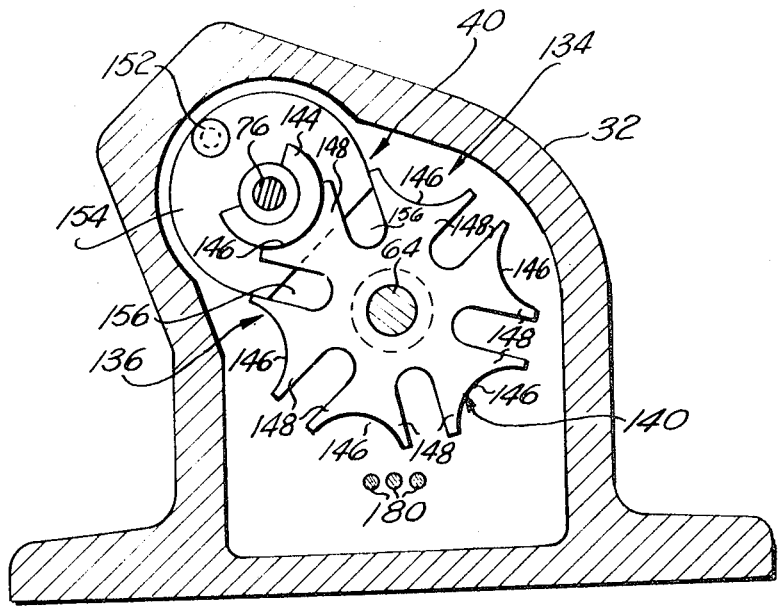
Figure 5:
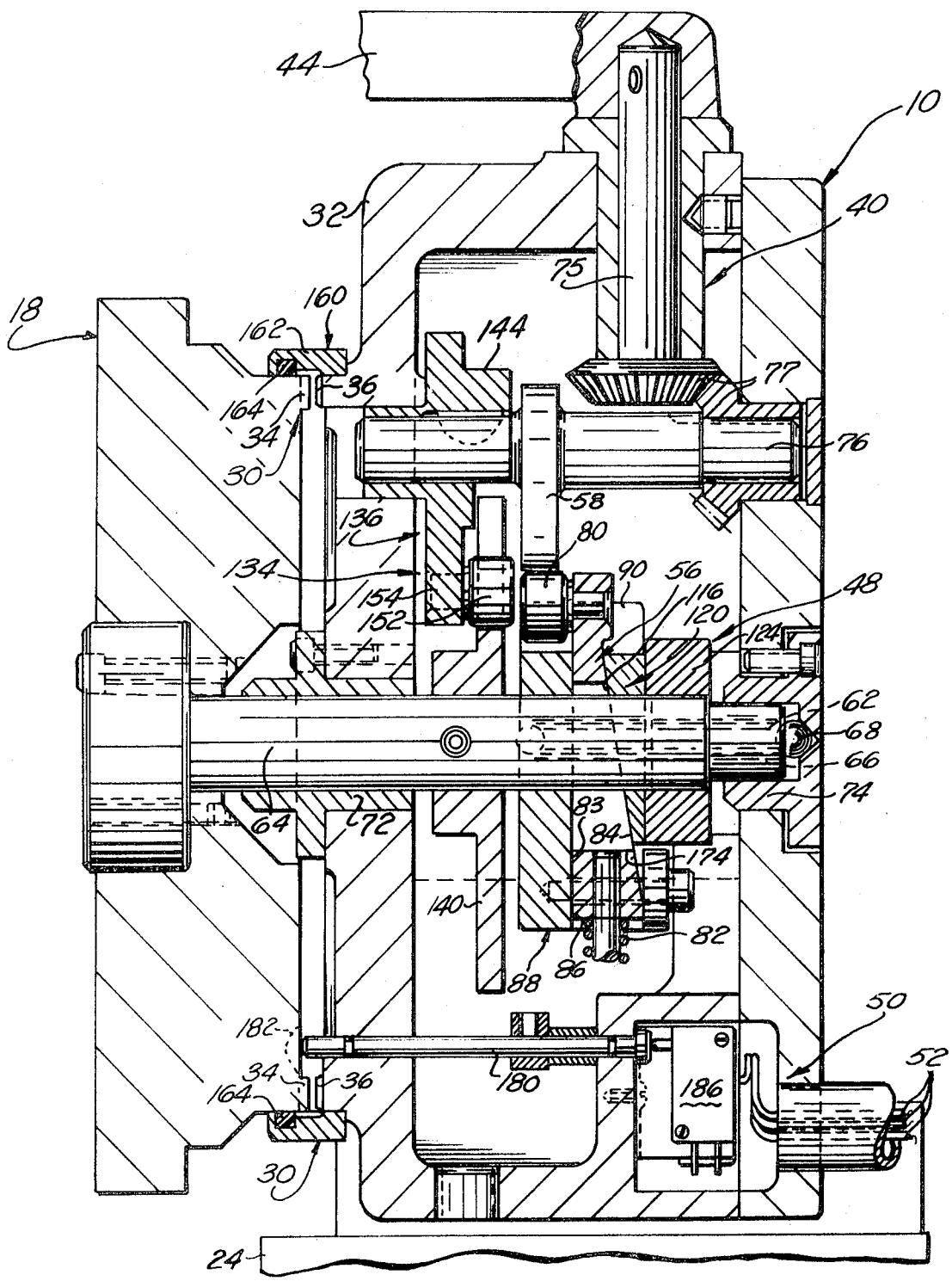

FIG. 5 is a sectional view, generally similar to FIG. 2, illustrating the turret assembly with the coupling in a disengaged condition and with the wedge member in the release position during operation of the drive assembly to effect rotation of the turret; and FIG. 6 is a sectional view, taken on a reduced scale along the line 6—6 of FIG. 2, illustrating the relationship between a Geneva wheel, Geneva arm, and a locking segment of the drive assembly.

The present invention provides an improved machine tool turret assembly having a rotatable turret member which holds a plurality of tools and is selectively rotatable in either one of two directions to move tools to and from an operating position. When a desired tool has been moved to the operating position by rotation of the turret member, a coupling is engaged with a constant clamping force to hold the turret member against further rotational movement. Although the specific preferred embodiment of the turret assembly illustrated in the drawings is manually operable and is associated with a turret lathe, it is contemplated that a turret assembly constructed in accordance with the present invention could be utilized in other types of machine tools and could be motor driven to effect automatic indexing of the turret member.

Figure 1:
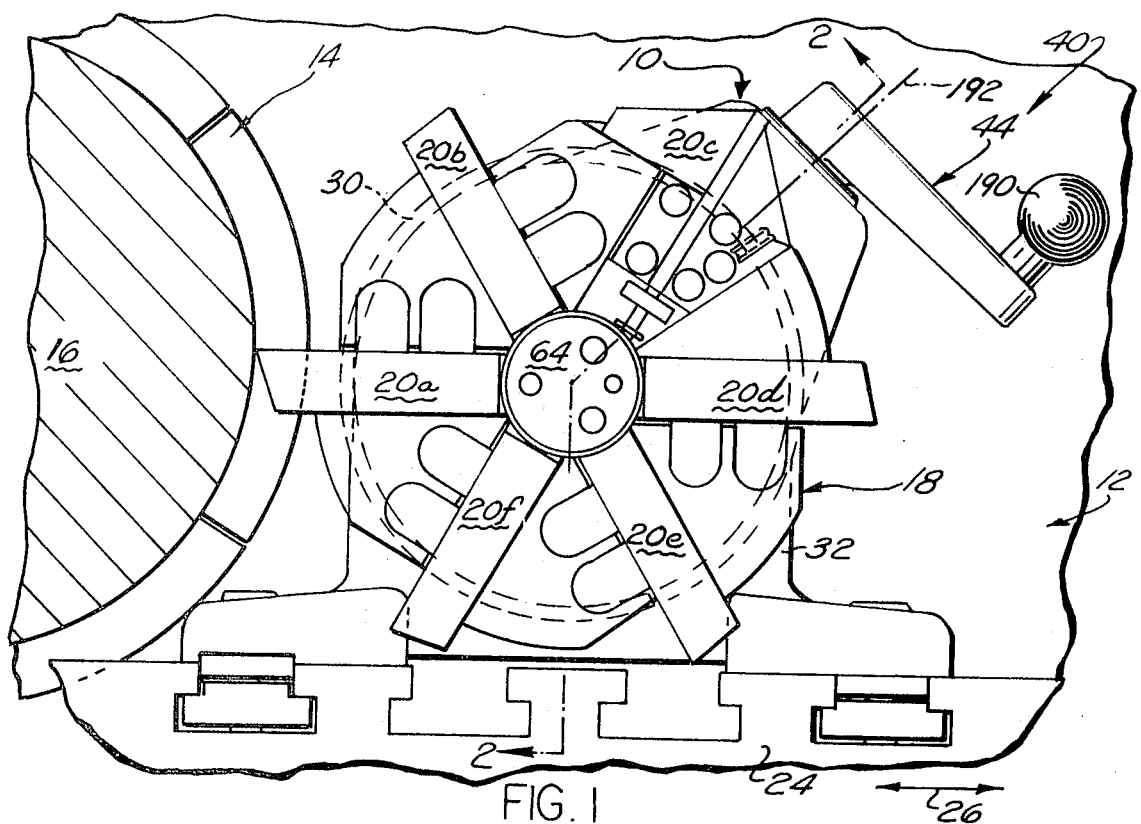

A turret assembly 10 constructed in accordance with the present invention is illustrated in FIG. 1 in association with a known turret lathe 12 having a spindle 14. The spindle 14 is operable to rotate a work piece 16 about its longitudinal axis in a known manner. The turret assembly 10 includes a rotatable turret member 18 which holds a plurality of tools 20a–f. The tool 20a is shown in an operating position in which it is movable to machine the work piece 16 as the work piece is rotated by the spindle 14. By effecting stepwise rotation of the turret member 18, a selected one of the tools 20b–f can be moved to the operating position and the tool 20a moved away from the operating position.

The turret assembly 10 is movable toward the work piece 16 to increase the depth of penetration of the tool 20a into the work piece 16 in a known manner. In addition, the turret assembly 10 is movable axially along the work piece 16 to perform known machining operations. To provide for this movement of the turret assembly 10 relative to the work piece 16, the turret assembly is mounted on a cross slide 24. The cross slide 24 is movable, in directions indicated by the arrow 26 in FIG. 1, to vary the position of the tool 20a relative to the work piece 16. The cross slide 24 is itself mounted on a carriage (not shown) which is movable in a known manner along bed ways of the turret lathe 12 to move the turret assembly 10 and cross slide 24 axially along the work piece 16.

A coupling 30 (see FIG. 2) holds the turret member 18 against rotational movement relative to a base housing 32 under the influence of operating forces applied to the tool 20a during operation of the machine tool 14. The coupling 30 is of the well known Curvic coupling type and includes a set of teeth 34 disposed in an annular array on the turret member 18 and a second set of teeth 36 disposed in an annular array on the base housing 32. When the coupling 30 is in the engaged condition illustrated in FIG. 2, the two sets of teeth 34 and 36 are pressed into meshing engagement to hold the turret 18 against rotational movement relative to the housing 32. A reversible drive assembly 40 is operable to actuate the coupling 30 to a disengaged condition (see FIG. 5) in which the teeth 34 and 36 are spaced apart and the turret member 18 is rotatable relative to the base housing 32.

The reversible drive assembly 40 is selectively operable in either one of two directions to effect stepwise rotation of the turret member 18 in a selected one of two directions. Thus, rotation of the manually actuatable handle 44 through one complete revolution in a counterclockwise direction (as viewed from above in FIG. 1) effects indexing of the turret member 18 in a clockwise direction (as viewed in FIG. 1) to move the tool 20f on the lower side of the operating position to the operating position. Similarly, rotation of the handle 44 through one complete revolution in a clockwise direction (as viewed from above in FIG. 1) effects indexing of the turret member 18 in a counterclockwise direction (as viewed in FIG. 1) to move the tool 20b disposed on the upper side of the operating position to the operating position.

Upon initial operation of the drive assembly 40, an actuator assembly 48 effects operation of the coupling 30 from the engaged condition of FIG. 2 to the disengaged condition of FIG. 5 to enable the turret member 18 to be rotated relative to the base housing 32 by further operation of the drive assembly 40. When the turret member 18 has been rotated through an arcuate distance sufficient to move one of the tools 20b or 20f to the operating position, the coupling 30 is operated to the engaged condition of FIG. 2 by the actuator assembly 48. The position of the turret member 18 is then sensed by a detector assembly 50 and signals determinative of the position of the turret member are transmitted over leads or wires 52 to a suitable control assembly for the machine tool 14.

Figure 3:
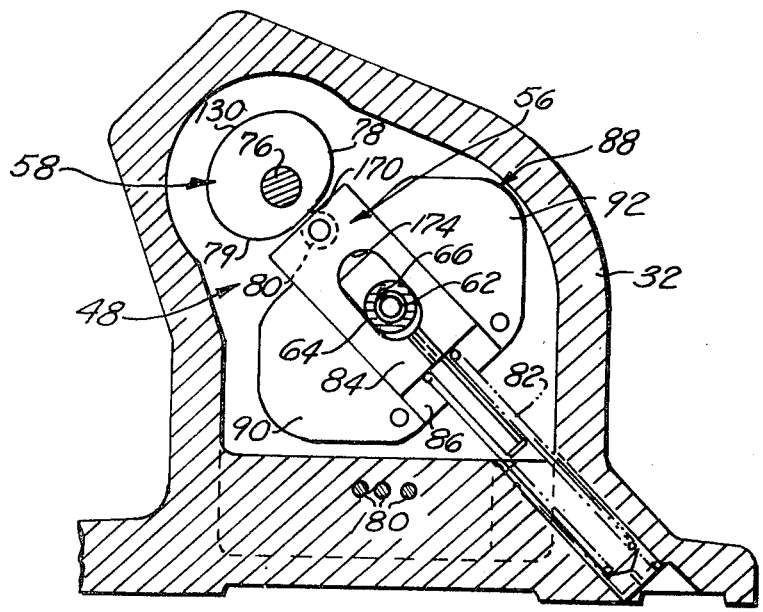
FIG. 3 is a sectional view, taken on a reduced scale along the line 3—3 of FIG. 2, illustrating the relationship between a wedge member for holding the coupling in an engaged condition and a cam for moving the wedge member to effect operation of the coupling to the disengaged condition, the wedge member being shown in a locking position.
Figure 4:
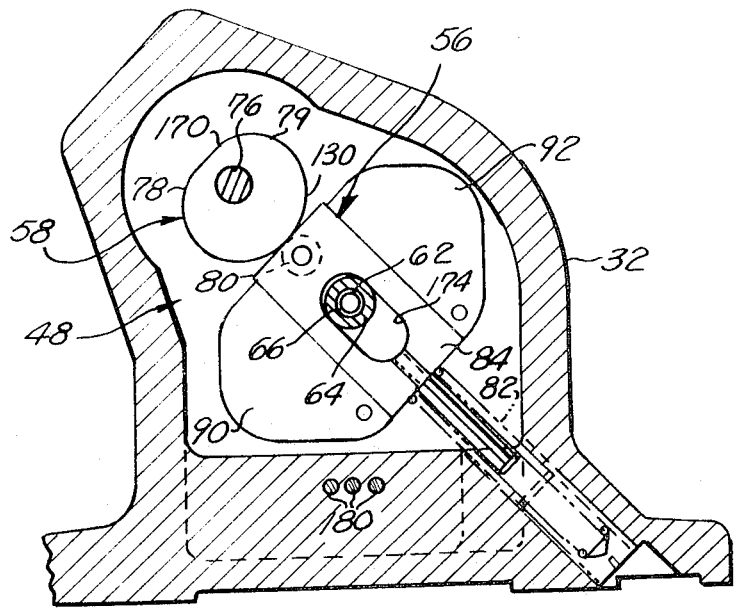
FIG. 4 is a sectional view, similar to FIG. 3, illustrating the relationship between the wedge member and cam when the wedge member is in a release position and the coupling is disengaged.

Upon initial rotation of the handle 44 in either the clockwise or counterclockwise direction, the actuator assembly 48 operates the coupling 30 from the engaged condition to the disengaged condition to thereby release the turret member 18 for rotational movement relative to the base housing 32 upon further rotation of the handle 44. To effect operation of the coupling 30 to the disengaged condition, the actuator assembly 48 includes a wedge member 56 which is moved linearly downwardly from the locking position (FIGS. 2 and 3) to the release position (FIGS. 4 and 5) by rotational movement of a cam 58 from the inactive position (FIGS. 2 and 3) to the operated or active position (FIGS. 4 and 5). As the wedge member 56 is moved from the locking position to the release position, an actuator spring 62 moves a turret support shaft 64 axially outwardly to disengage the coupling 30 by moving the turret member 18 axially away from the base housing 32. The actuator spring 62 is received in a generally cylindrical opening 66 in the turret support shaft 64 and presses against a ball 68 to urge the turret support shaft axially outwardly. The turret support shaft 64 is fixedly connected to the turret 18 and is supported for rotational and axial movement relative to the housing 32 by suitable sleeve type bearing blocks 72 and 74.

Rotation of the cam 58 from the inactive position (FIG. 2) to the active position (FIG. 5) is effected by rotating the handle 44 to rotate a drive shaft 75 relative to the housing 32. Rotation of the drive shaft 75 is transmitted to a shaft 76 through bevel gears 77. As the shaft 76 is rotated, one of two ramps 78 or 79 (FIG. 3), depending upon the direction of rotation of the shaft 76, is moved into engagement with a cam follower 80 mounted on the narrow end portion of the wedge member 56. Continued rotation of the cam 58 causes the wedge member 56 to be forced downwardly, against the action of the biasing spring 82, from the locking position in which the coupling 30 is held in the engaged condition to the release position in which the coupling 30 is disengaged.

To provide for axial movement of the turret support shaft 64 upon movement of the wedge member 56 from the locking position to the release position, the wedge member is tapered and includes a rectangular forward face surface 83 and a rectangular rearward face surface 84. In the embodiment of the invention illustrated in FIG. 2, the wedge member 56 is disposed with the face surfaces 83 and 84 sloping upwardly toward each other at an acute angle. The forward face surface 83 of the wedge member 56 is located in sliding engagement with a rectangular reaction surface 86 formed on a reaction block or member 88. The reaction block or member 88 is fixedly connected to the base housing 32 (See FIG. 3) and includes a pair of guide sections 90 and 92 for guiding the wedge member 56 along a linear path as the wedge member is reciprocated upon rotation of the cam 58.

As the wedge member 56 is moved from the locking position toward the release position under the influence of the cam 58, the forward face surface 83 of the wedge member 56 slides along the reaction surface 86 of the reaction block 88. Since the rearward face surface 84 of the wedge member 56 is disposed at an acute angle to the face surface 83, downward movement of the wedge member 56 would cause the rearward face surface 84 to tend to move away from a rectangular follower surface 116 formed on a follower member 120 if the turret support shaft 64 was held against axial movement. However, the actuator spring 62 urges the turret support shaft 64 toward the left as viewed in FIG. 2. This causes a follower block 124, fixedly connected to the shaft 64, to press the follower member 120 against the rearward face surface 84 of the wedge member 56. As the wedge member 56 is moved downwardly, the decreasing thickness of the portion of the wedge member 56 located between the reaction surface 86 and follower surface 116 enables the turret support shaft 64 to be moved axially outwardly from the position shown in FIG. 2 to the position shown in FIG. 5 to thereby disengage the coupling 30.

Once the coupling 30 has been operated to the disengaged condition of FIG. 5 by the actuator assembly 48, further rotation of the handle 44 effects an indexing of the turret member 18 through one step to thereby move either the tool 20b or the tool 20f to the operating position. During this rotational movement of the turret member 18, an outer dwell surface 130 on the cam 58 engages the cam follower 80 to hold the wedge member 56 in the release position of FIG. 4 against the influence of the biasing spring 82. Of course, holding the wedge member 56 in the release position maintains the coupling 30 in the disengaged condition so that the turret member 18 can be rotated relative to the base housing 32 by a turret indexing assembly 134.

The turret indexing assembly 134 forms a part of the drive assembly 40 and includes a Geneva mechanism 136. The Geneva mechanism 136 is operable to rotate the turret support shaft 64 and turret member 18 through an arcuate distance sufficient to move the tool 20a away from the operating position and to move one of the next adjacent tools 20b or 20f to the operating position. The Geneva mechanism 136 includes a Geneva wheel 140 (FIG. 6) which is fixedly connected to the shaft 64. When the coupling 30 is in the engaged condition of FIG. 2, a locking segment 144 engages an arcuate outer end surface 146 of a tooth 148 of the Geneva wheel 140. The locking segment 144 is fixedly connected with the drive shaft 76. Therefore, the locking segment 144 moves out of engagement with the associated outer surface 146 of the Geneva wheel 140 upon rotation of the drive shaft 76 to operate the actuator assembly 48 to the release condition.

Continued rotational movement of the drive shaft 76 causes a Geneva drive roller 152 (FIG. 6) on a Geneva arm 154 to move into one of the recesses 156 between the teeth of the Geneva wheel 140. Continued rotation of the shaft 76 causes the Geneva arm 154 to rotate the Geneva wheel 140 in a known manner to effect rotational movement of the shaft 64 and turret member 18. During this rotational movement of the Geneva arm 154, the outer dwell surface 130 of the cam 58 maintains the wedge member 56 in the release position of FIG. 4.

If the handle 44 is rotated in a counterclockwise direction is viewed from above in FIG. 1, the Geneva arm 154 is rotated in a clockwise direction (as viewed in FIG. 6) by the shaft 76 to which it is fixedly secured. Therefore, the Geneva arm 154 effects rotation of the Geneva wheel 140 in a counterclockwise direction, as viewed in FIG. 6, to move the lower tool 20f to the operating position. Conversely, if the handle 44 is rotated in a clockwise direction as viewed from above in FIG. 1, the Geneva arm 154 is rotated in a counterclockwise direction (as viewed in FIG. 6) to move the upper tool 20b to the operating position.

After a selected one of the tools 20b or 20f has been moved to the operating position, continued rotation of the handle 44 effects movement of the locking segment 144 into engagement with the geneva wheel 140. The locking segment 144 then holds the shaft 64 and turret member 18 against rotational movement while the coupling 30 is operated from the disengaged condition to the engaged condition. It should be noted that while the coupling 30 is in the disengaged condition, a seal assembly 160 (FIG. 5) keeps chips and other foreign materials from entering between the turret member 18 and housing 32. The seal assembly 160 includes an annular support ring 162 in which an annular seal member 164 is mounted. An inner surface of the seal member 164 engages the turret member 18 to prevent chips and foreign materials from entering between the turret member 18 and the support member 162 when the coupling 30 is disengaged.

As the rotational movement of the handle 44 is continued through a complete revolution, the actuator assembly 48 effects operation of the coupling 30 to the engaged condition. Thus as the shaft 76 is rotated, the outer dwell surface 130 of the cam 58 (see FIG. 4) is moved out of engagement with the cam follower 80 and one of the ramps 78 or 79 (depending on the direction of rotation of the drive shaft 76) moves into engagement with the cam follower. As the rotational movement of the cam 58 continues, the biasing spring 82 urges the wedge member 56 upwardly toward the locking position of FIG. 2. As the wedge member 56 is moved from the release position to the locking position, the outer face surface 83 of the wedge member slides along the reaction surface 86 of the reaction block 88 and the inner face surface 84 slides along the follower surface 116 of the follower member 120. The sliding movement of the face surface 84 relative to the follower surface 116 cams the follower member 120 rearwardly, or toward the right as viewed in FIG. 5, to move the coupling teeth 34 of the turret member 18 into meshing engagement with the coupling teeth 36 on the base housing 32. When the two sets of coupling teeth 34 and 36 are engaged and press against each other, they prevent further rearward movement of the turret member 18 and support shaft 64 under the influence of the wedge member 56.

Once the coupling 30 has been engaged, a constant clamping force of a predetermined magnitude presses the sets of coupling teeth 34 and 36 together to maintain the coupling in secure engagement. This clamping force results from the fact that the cam 58 is moved out of engagement with the follower 80 (see FIGS. 2 and 3) and from the application of a biasing force against the wedge member 56 by the spring 82. Thus, continued rotation of the cam 56 moves an inner dwell surface 170 into a spaced apart relationship with the follower 80. The spring 82 applies a biasing force against the wedge member 56 urging it upwardly (as viewed in FIG. 2). This causes the wedge member 56 to press the follower member 120 toward the right (as viewed in FIG. 2) to provide a substantially constant and predetermined clamping force between the sets of teeth 34 and 36 of the coupling 30.

It should be noted that this constant clamping force results from the influence of the biasing spring 82 against the wedge member 56 and is substantially the same regardless of the manner in which the handle 44 is rotated. Therefore, the same predetermined clamping force urges the coupling 30 to the engaged condition each time the turret assembly 10 is operated to index the turret member 18. Since this substantially constant clamping force must be overcome by the operator to move the handle 44, the operator must exert substantially the same force against the handle 44 to disengage the coupling 30 on each of a plurality of successive indexing operations of the turret assembly 10.

During operation of the coupling 30 between the engaged and disengaged conditions of FIGS. 2 and 5, the turret support shaft 64 is moved axially relative to the housing 32. Therefore the Geneva wheel 140, which is fixedly secured to the shaft 64, moves axially relative to the Geneva arm 154. However, the wedge member 56 is retained against axial movement with the shaft 64 by the reaction block 88 which is fixedly connected to the housing 32 and supports the shaft for both sliding and rotational movement relative to the housing.

To enable the turret support shaft 64 to be connected to the follower block 124, which is on the rearward side of the wedge member 56, the wedge member defines an oblong opening or slot 174 (see FIGS. 3 and 4) through which the shaft 64 extends. The slot 174 enables the wedge member 56 to move transversely relative to the shaft 64. The follower member 120 and follower block 124 both move axially with the shaft 64. However, upon rotational movement of the turret support shaft 64, the follower member 120 is held against rotation by the guide sections 90 and 92 of the reaction block 88. Therefore, the follower block 124 rotates with the shaft 64 relative to the follower member 120 upon rotation of the shaft 64 by the turret indexing assembly 134.

The detector assembly 50 includes a plurality of sensing pins 180 which cooperate with recesses 182 (see FIGS. 2 and 5) in the turret member 18 to detect the position of the turret member relative to the housing 32. A different combination of recesses is provided in the turret member 18 adjacent to each of the tools 20a-f so that the axial positions of the detector pins 180 vary in accordance with the tool located at the operating position. When a recess is adjacent to a detector pin, a sensor switch 186 associated with the detector pin remains in an unactuated condition. However, if a recess 182 is not provided in the turret 18 adjacent to one of the detector pins 180, the associated sensor switch 156 is actuated by the detector pin. A distinctive combination of recesses is associated with each of the tools 20a-f. Therefore, a distinctive combination of switches 186 is operated for each position of the turret member 18 relative to the base 32. Thus for each position of the turret member 18 a distinctive combination of signals is provided over the leads 52 to indicate the position of the turret member relative to the base 32.

In the specific preferred embodiment the invention illustrated in the drawings, the turret assembly 10 is indexed by manually grasping a knob 190 (see FIG. 1) of a handle 44 to rotate the handle about the axis indicated at 192 in FIG. 1. However, it is contemplated that the drive assembly 40 could include an electric motor and magnetic clutch assembly, such as is disclosed in U.S. Pat. No. 2,979,971 to Darash, to effect automatic indexing of the turret assembly 10. Since the drive assembly 40 is reversible to index the turret member 18 in either a clockwise or counterclockwise direction, it is also contemplated that the electric motor would be a reversible motor to effect indexing of the turret member in either of these directions.

When an operator grasps the knob 190 and rotates the handle 44 through a complete revolution about the axis 192, the drive assembly 40 indexes the turret 18 by one position in a direction determined by the direction of rotation of the handle 44. As the operator moves the knob 190, his hand moves along an annular path toward the work piece 16 which may be rotating under the influence of the spindle 14. To prevent the operator's hand from being injured by engagement with the rotating work piece 16, the axis 192 about which the handle 44 is rotated extends upwardly and away from the workpiece at an acute angle to the direction in which the cross slide 24 is moved relative to the workpiece.

Upon initiation of rotational movement of the handle 44, the operator's hand moves from a position disposed on a side of the turret assembly 10 away from the work piece 16 and beneath a plane extending through an uppermost portion of the turret assembly to a position in which the operator's hand is above the uppermost portion of the turret assembly. When the operator's hand is closest to the work piece 16, his hand is located slightly rearwardly, i.e., in a direction away from the workpiece 16, of a vertical plane extending through the axis of rotation of the turret member 18 in a direction perpendicular to the path of movement of the cross slide 24. Therefore, the operator's hand will at all times during rotation of the handle 44 be clear of the workpiece 16. To further promote operator safety, the base housing 32 slopes upwardly and away from the workpiece 16 to enable the operator to clearly see the workpiece while he is rotating the handle 44 and during machining of the workpiece 16 by a tool in the operating position.

In view of the foregoing description, it can be seen that the turret assembly 10 includes a reversible drive assembly 40 which is operable in either one of two different directions to index a selected tool to an operating position. Upon initial operation of the drive assembly 40, the wedge member 56 is moved by the cam 58 to operate the coupling 30 to the disengaged condition. Continued operation of the drive assembly 40 causes the Geneva arm 154 to step or index the Geneva wheel 140 to thereby rotate the turret member 18 relative to the base housing 32 and move a selected one of the tools to the operating position. Still further operation of the drive assembly 40 results in the coupling 30 being moved to the engaged condition by operation of the actuator assembly 48. The biasing spring 82 then presses the wedge member 56 against the follower member 120 with a predetermined biasing force to press the coupling teeth 34 against the coupling teeth 36 with a constant clamping force.

Having described a specific preferred embodiment of the invention the following is claimed:

1. A turret assembly for holding a plurality of tools for operating on a work piece in a work area, said turret assembly comprising a base, a turret rotatably mounted on said base for holding the plurality of tools with a selected one of the tools in a predetermined operating position relative to the work piece and with other tools disposed on opposite sides of the operating position, coupling means for operatively interconnecting said turret and said base and including a first set of teeth connected to said turret and a second set of teeth connected to said base, said coupling means being operable between an engaged condition in which said first and second sets of teeth are disposed in meshing engagement to hold said turret against rotational movement relative to said base and a disengaged condition in which said first and second sets of teeth are spaced from each other to release said turret for rotational movement relative to said base, actuator means for operating said coupling means between the engaged and disengaged conditions, said actuator means including a wedge member movable between a locking position holding said coupling means in the engaged condition and a release position in which said coupling means is operable to the disengaged condition, and cam means for effecting movement of said wedge member from the locking position to the release position, and reversible drive means operable in a first direction to rotate said turret in one direction to move a tool disposed on one side of the operating position to the operating position and operable in a second direction to rotate said turret in another direction opposite to said one direction to move a tool on another side of the operating position to the operating position when said coupling means has been operated to the disengaged condition by said actuator means.

2. A turret assembly for holding a plurality of tools for operating on a work piece in a work area, said turret assembly comprising a base, a turret rotatably mounted on said base for holding the plurality of tools with a selected one of the tools in a predetermined operating position relative to the work piece and with other tools disposed on opposite sides of the operating position, coupling means for operatively interconnecting said turret and said base and including a first set of teeth connected to said turret and a second set of teeth connected to said base, said coupling means being operable between an engaged condition in which said first and second sets of teeth are disposed in meshing engagement to hold said turret against rotational movement relative to said base and a disengaged condition in which said first and second sets of teeth are spaced from each other to release said turret for rotational movement relative to said base, actuator means for operating said coupling means between the engaged and disengaged conditions, and reversible drive means operable in a first direction to rotate said turret in one direction to move a tool disposed on one side of the operating position to the operating position and operable in a second direction to rotate said turret in another direction opposite to said one direction to move a tool on another side of the operating position to the operating position when said coupling means has been operated to the disengaged condition by said actuator means, said actuator means including a wedge member reciprocatable along a predetermined path between a locking position holding said coupling means in the engaged condition and a release position in which said coupling means is operable to the disengaged condition, and cam means operable in response to operation of said drive means in either of said first and second directions to effect movement of said wedge member in the same direction along the predetermined path from the locking position to the release position to thereby release said coupling means for operation from the engaged condition to the disengaged condition upon operation of said drive means in either of the first and second directions.

3. A turret assembly as set forth in claim 2 further including spring means for urging said wedge member from the release position to the locking position and for applying a substantially constant clamping force urging said coupling means to the engaged position when said wedge member is in the locking position.

4. A turret assembly for holding a plurality of tools for operating on a work piece in a work area, said turret assembly comprising a base, a turret rotatably mounted on said base for holding the plurality of tools with a selected one of the tools in a predetermined operating position relative to the work piece and with other tools disposed on opposite sides of the operating position, coupling means for operatively interconnecting said turret and said base and including a first set of teeth connected to said turret and a second set of teeth connected to said base, said coupling means being operable between an engaged condition in which said first and second sets of teeth are disposed in meshing engagement to hold said turret against rotational movement relative to said base and a disengaged condition in which said first and second sets of teeth are spaced from each other to release said turret for rotational movement relative to said base, actuator means for operating said coupling means between the engaged and disengaged conditions, reversible drive means operable in a first direction to rotate said turret in one direction to move a tool disposed on one side of the operating position to the operating position and operable in a second direction to rotate said turret in another direction opposite to said one direction to move a tool on another side of the operating position to the operating position when said coupling means has been operated to the disengaged condition by said actuator means, and a shaft fixedly connected at one end portion to said turret and supported on said base for axial movement relative to said base to effect operation of said coupling means between the engaged and disengaged conditions, said shaft being rotatable about its longitudinal axis by operation of said drive means to rotate said turret relative to said base, said actuator means including a wedge member movable relative to said shaft between a locking position holding said shaft against axial movement relative to said base to thereby retain said coupling means against operation to the disengaged condition and a release position in which said shaft is movable axially relative to said base to thereby enable said coupling means to be operated to the disengaged condition, said actuator means including a follower member operatively connected to said shaft and movable axially therewith upon axial movement of said shaft relative to said base to effect operation of said coupling means between the engaged and disengaged conditions, and spring means for urging a surface of said follower member into abutting engagement with a surface of said wedge member to effect movement of said shaft axially relative to said base upon movement of said wedge member between the locking and release positions.

5. A turret assembly as set forth in claim 4 wherein said wedge member defines a longitudinally extending opening and said shaft extends axially from said turret through said opening, said follower member being operatively connected to an end portion of said shaft located on a side of said wedge member opposite from said turret.

6. A turret assembly for holding a plurality of tools for operating on a work piece in a work area, said turret assembly comprising a base, a turret rotatably mounted on said base for holding the plurality of tools with a selected one of the tools in a predetermined operating position relative to the work piece, coupling means for operatively interconnecting said turret and said base and including a first clamping surface connected with said turret and a second clamping surface connected with said base, said coupling means being operable between an engaged condition in which said first and second clamping surfaces are disposed in engagement to hold said turret against rotational movement relative to said base and a disengaged condition in which said first and second clamping surfaces are spaced from each other to release said turret for rotational movement relative to said base, a reaction surface connected with said base, a wedge member having a first face surface disposed in abutting engagement with said reaction surface and a second face extending at an acute angle to said first face surface, a follower member operatively connected with said coupling means and having a follower surface disposed in abutting engagement with said second face surface of said wedge member, said follower member being movable relative to said reaction surface from a first position to a second position to move said turret relative to said base and thereby effect operation of said coupling means from the engaged condition to the disengaged condition, spring means for providing a predetermined clamping force between said clamping surfaces when said follower member is in the first position by applying a biasing force to said wedge member to press said second face surface of said wedge member against said follower surface, actuator means for moving said wedge member relative to said reaction and follower surfaces against the influence of said spring means to effect movement of said follower member from said first position to said second position to thereby effect operation of said coupling means from the engaged condition to the disengaged condition, and drive means for rotating said turret to move a selected one of the plurality of tools to the operating position when said follower member is in the second position and said coupling means is in the disengaged condition.

7. A turret assembly as set forth in claim 6 wherein said drive means includes cam means movable from an inactive position to an active position to effect movement of said wedge member relative to said reaction and follower surfaces against the influence of said spring means, said cam means being ineffective when in the inactive position to resist the biasing force applied to said wedge member by said spring means to thereby promote the application of a biasing force to said follower member by said wedge member.

8. A turret assembly as set forth in claim 7 wherein said drive means includes a geneva wheel operatively connected to said turret for imparting intermittant motion to said turret upon operation of said drive means, a drive shaft supported by said base, a geneva arm connected to said drive shaft, and means for rotating said drive shaft to move said geneva arm into driving engagement with said geneva wheel to thereby rotate said geneva wheel and move said turret, said cam means being connected to said drive shaft for movement from the inactive position to the active position upon initial rotation of said drive shaft before said geneva arm moves into driving engagement with said geneva wheel.

9. A turret assembly as set forth in claim 6 further including a shaft extending axially from said turret and operatively connected to said follower member, mounting means supporting said shaft for axial movement relative to said base upon movement of said follower member from the first position to the second position to move said turret relative to said base and thereby operate said coupling means from the engaged condition to the disengaged condition, said drive means be operable to rotate said shaft relative to said base to thereby rotate said turret when said coupling means is in the disengaged condition.

10. A turret assembly as set forth in claim 9 wherein said drive means is operable to rotate said shaft and turret in a first direction to move a selected tool located on one side of the operating position to the operating position and is operable to rotate said shaft and turret in a second direction to move a selected tool located on another side of the operating position to the operating position.

11. A turret assembly for holding a plurality of tools for operating on a work piece in a work area, said turret assembly comprising a base, a turret rotatably mounted on said base for holding the plurality of tools with a selected one of the tools in a predetermined operating position relative to the work piece and with other tools disposed on opposite sides of the operating position, coupling means for operatively interconnecting said turret and said base and including a first set of teeth connected to said turret and a second set of teeth connected to said base, said coupling means being operable between an engaged condition in which said first and second sets of teeth are disposed in meshing engagement to hold said turret against rotational movement relative to said base and a disengaged condition in which said first and second sets of teeth are spaced from each other to release said turret for rotational movement relative to said base, actuator means for operating said coupling means between the engaged and disengaged conditions, said actuator means including a wedge member movable relative to said turret in a first directionto effect operation of said coupling means to the disengaged condition and movable relative to said turret in a second direction to effect operation of said coupling means to the engaged condition, spring means for urging said wedge member in the second direction with a predetermined spring force to provide a predetermined clamping force between said sets of teeth when said coupling means is in the engaged condition, and operator means for moving said wedge member in the first direction against the influence of said spring means to thereby effect operation of said coupling means to the disengaged condition, and reversible drive means operable in a first direction to rotate said turret in one direction to move a tool disposed on one side of the operating position to the operating position and operable in a second direction to rotate said turret in another direction opposite to said one direction to move a tool on another side of the operating position to the operating position when said coupling means has been operated to the disengaged condition by said actuator means.

12. A turret assembly as set forth in claim 7 wherein said turret is rotatable about a first axis which extends parallel to a longitudinal axis of the workpiece and wherein said drive means includes a handle having an inner end portion pivotally connected with said base and a manually engageable outer end portion which is movable along an annular path having a central axis extending perpendicular to said first axis and extending at an acute angle to a plane extending through both the first axis and the longitudinal axis of the workpiece.

* * * * *